(12) United States Patent
Kim

(10) Patent No.: US 7,747,439 B2
(45) Date of Patent: Jun. 29, 2010

(54) METHOD AND SYSTEM FOR RECOGNIZING PHONEME IN SPEECH SIGNAL

(75) Inventor: Hyun-Soo Kim, Yongin-si (KR)

(73) Assignee: Samsung Electronics Co., Ltd (KR)

(*) Notice: Subject to any disclaimer, the term of this patent is extended or adjusted under 35 U.S.C. 154(b) by 769 days.

(21) Appl. No.: 11/714,080

(22) Filed: Mar. 5, 2007

(65) Prior Publication Data
US 2007/0225981 A1  Sep. 27, 2007

(30) Foreign Application Priority Data
Mar. 7, 2006  (KR) ...................... 10-2006-0021352

(51) Int. Cl.
G10L 13/00 (2006.01)
G10L 19/14 (2006.01)
G10L 15/00 (2006.01)
G10L 15/04 (2006.01)

(52) U.S. Cl. ........................ 704/258; 704/211; 704/238; 704/254

(58) Field of Classification Search ........................ None
See application file for complete search history.

(56) References Cited

U.S. PATENT DOCUMENTS

| 4,783,807 A | * | 11/1988 | Marley | ........................ 704/235 |
| 5,787,395 A | | 7/1998 | Minamino | |
| 5,825,977 A | * | 10/1998 | Morin et al. | ................. 704/255 |
| 6,959,278 B1 | * | 10/2005 | Shu et al. | ..................... 704/243 |
| 2003/0033145 A1 | * | 2/2003 | Petrushin | ..................... 704/236 |
| 2003/0225580 A1 | | 12/2003 | Lin | |

FOREIGN PATENT DOCUMENTS

| KR | 1020040014835 | 2/2004 |
| KR | 1020040061070 | 7/2004 |
| KR | 1020040076035 | 8/2004 |
| KR | 1020050011441 | 1/2005 |
| WO | WO 2004/057574 | 7/2004 |

OTHER PUBLICATIONS

Kim et al., "Nonparametric Peak Feature Extraction and its Applications to Speech Signals", in Proc. Eighth Aust. Int. Conf. on Speech Science and Technology (SST 00), Dec. 5-7, 2000, pp. 256-261.*

* cited by examiner

*Primary Examiner*—David R Hudspeth
*Assistant Examiner*—Brian L Albertalli
(74) *Attorney, Agent, or Firm*—The Farrell Law Firm, LLP

(57) ABSTRACT

A method of correctly segmenting phonemes by determining a boundary indicating a start point and an end point of each of the segmented phonemes, and correctly finding the phoneme in the speech signal by determining which phoneme in a phoneme recognition standard table corresponds to each of the segmented phonemes. Using this phoneme recognition method, an amount of computation can be significantly reduced, and the phoneme in the speech signal can be easily found by calculating probability distances between phonemes.

17 Claims, 9 Drawing Sheets

| PHONEME | Mean Values | | | Standard Deviation | | |
|---|---|---|---|---|---|---|
| | FIRST-ORDER PEAK | SECOND-ORDER PEAK | THIRD-ORDER PEAK | FIRST-ORDER PEAK | SECOND-ORDER PEAK | THIRD-ORDER PEAK |
| IY | 53.7 | 13.3 | 5 | 4.8 | 3.1 | 1 |
| IH | 38.6 | 11.8 | 3.4 | 4.3 | 2.4 | 1.3 |
| EY | 45.3 | 12.8 | 3.4 | 3.8 | 2.1 | 1.2 |
| EH | 48.4 | 15.6 | 3.7 | 4.3 | 2.2 | 1.3 |
| AE | 60.7 | 15.7 | 4.7 | 5.2 | 2.3 | 1.3 |
| AA | 58.5 | 17.6 | 5.2 | 7.7 | 3.6 | 1.5 |
| AH | 40.3 | 12.4 | 3.4 | 2.1 | 2 | 1.1 |
| AO | 40.6 | 11.5 | 3.4 | 3.5 | 1.8 | 1.2 |
| OW | 38.8 | 12.3 | 3.5 | 3.3 | 2.8 | 1.4 |
| UH | 35.1 | 10.9 | 3.3 | 3.2 | 1.9 | 0.9 |
| UW | 24.7 | 6.9 | 2.4 | 2.4 | 1.6 | 1 |
| AX | 42.7 | 11.1 | 3 | 3.9 | 1.9 | 1.3 |
| IX | 43.5 | 14.8 | 4.2 | 3.3 | 2.1 | 1.5 |
| ER | 35.2 | 12.9 | 3 | 2.9 | 2 | 1 |
| AXR | 36.8 | 11.8 | 3.1 | 3.5 | 2 | 1 |
| AW | 51.8 | 12.7 | 3.7 | 4.7 | 2.8 | 1.2 |
| AY | 50 | 13.2 | 3.7 | 6.6 | 2.9 | 1.2 |
| OY | 35.5 | 10.6 | 3 | 2.3 | 1.8 | 1 |
| Y | 36.7 | 11.1 | 3.4 | 5.1 | 2.2 | 1.2 |
| W | 36 | 10 | 3.1 | 4.5 | 2.8 | 1 |
| R | 30.6 | 9.9 | 3.1 | 2.3 | 2.2 | 1 |
| L | 33.2 | 10.9 | 2.9 | 2.8 | 1.7 | 0.9 |
| M | 33.5 | 8.7 | 2.9 | 8 | 1.4 | 0.8 |
| N | 26.8 | 7.2 | 2.6 | 6.9 | 2.3 | 1.2 |
| NX | 26.9 | 7.2 | 2.3 | 6 | 1.9 | 1.2 |
| P | 40.2 | 11.6 | 3.6 | 8 | 2 | 1.2 |
| T | 71.6 | 21.8 | 5.4 | 4.7 | 1.5 | 0.7 |
| K | 56.8 | 15.5 | 6.3 | 1.7 | 1.7 | 0.7 |
| B | 32.5 | 11.2 | 5 | 3.2 | 2 | 1 |
| D | 68.5 | 16.98 | 5.4 | 6.4 | 1 | 0.7 |
| H | 37.7 | 11.6 | 5.2 | 2.7 | 1.5 | 0.4 |
| HH | 63.5 | 20.4 | 5.8 | 6.7 | 2.6 | 1.4 |
| F | 42.6 | 10.9 | 4.7 | 8.5 | 2.7 | 0.9 |
| TH | 39.2 | 9.2 | 3.5 | 7.7 | 1.9 | 0.7 |
| S | 70.3 | 20.1 | 6.2 | 8.1 | 2.7 | 1.1 |
| SH | 58 | 18.9 | 6 | 8.9 | 2.7 | 1.1 |
| V | 33.4 | 8.6 | 2.9 | 3.4 | 1.7 | 1 |
| DH | 25.6 | 8.1 | 2.7 | 7.3 | 2.8 | 0.9 |
| Z | 38.2 | 10 | 3.3 | 9.1 | 2.7 | 1.2 |
| ZH | 22.6 | 6.1 | 2 | 4.5 | 1.6 | 0.9 |
| CH | 75.1 | 22.9 | 7.7 | 7.4 | 1.9 | 0.9 |
| JH | 66.1 | 18.3 | 5.7 | 3 | 1.6 | 1 |
| WH | 28.3 | 8.4 | 2.8 | 3.3 | 1.4 | 0.9 |
| EL | 32.4 | 7.3 | 2.7 | 5.2 | 2.4 | 0.9 |
| EM | 38.7 | 8.4 | 2.9 | 4.8 | 3.1 | 0.9 |

FIG.9

METHOD AND SYSTEM FOR RECOGNIZING PHONEME IN SPEECH SIGNAL

PRIORITY

This application claims priority under 35 U.S.C. §119 to an application filed in the Korean Intellectual Property Office on Mar. 7, 2006 and assigned Serial No. 2006-21352, the contents of which are incorporated herein by reference.

BACKGROUND OF THE INVENTION

1. Field of the Invention

The present invention generally relates to a method and system for recognizing a phoneme in a speech signal, and in particular, to a method of recognizing a phoneme in a speech signal, which is used in a speech recognition system, and a system using the method.

2. Description of the Related Art

Various techniques using a speech signal are applied to various systems including a speech recognition system, where it is important to know whether correct speech can be input to a relevant system by correctly detecting a start-point and an end-point of a speech signal when the speech signal is input.

In particular, a method of distinguishing a phoneme should be studied to recognize a speech signal. According to the prior art, when phonemes are segmented by obtaining locations thereof, methods of distinguishing the segmented phonemes and obtaining the contents of the segmented phonemes are achieved through very complex processes, most of which are constituted by combining a statistical method and a plurality of measure extraction methods.

One of the most frequently used methods combines a plurality of cepstral or perceptual linear predictive coding (LPC) coefficients. However, this method also has an intrinsic limit that a linear prediction method has.

Performance of the linear prediction method frequently used in speech signal analysis depends on an order of linear prediction. However, if the order of linear prediction is increased to increase the performance, an amount of computation increases, and furthermore, the performance is not increased more than a certain level. The linear prediction method is available only in a short-time stationary assumption in which a signal does not vary for a short time and an assumption that a vocal tract transfer function can be modeled using a linear all pole model.

In addition, in the linear prediction method, a formant center frequency has a high amount of computation due to LPC polynomial root calculation, and a peak may not be robust in peak picking of a spectral envelope.

In addition, the linear prediction method uses data windowing. However, if a resolution balance between a time axis and a frequency axis is not maintained when the data windowing is selected, it is difficult to detect a spectral envelope. For example, in a case of speech having a very high pitch, individual harmonics are followed in the linear prediction method due to wide gaps of the harmonics. Thus, in a case of a female or child, performance of the linear prediction method decreases.

As described above, it is inconvenient due to a high amount of computation to distinguish and recognize a phoneme using a conventional method. Thus, a method of recognizing a phoneme more correctly while reducing an amount of computation is desired.

SUMMARY OF THE INVENTION

An object of the present invention is to substantially solve at least the above problems and/or disadvantages and to provide at least the advantages below. Accordingly, an object of the present invention is to provide a method of recognizing a phoneme in a speech signal, which is used in a speech recognition system, and a system using the method.

According to one aspect of the present invention, there is provided a method of recognizing a phoneme in a speech signal, the method including segmenting phonemes by determining boundaries between the phonemes in an input speech signal; determining a frame length to be used for calculating peak statistical values of each of the segmented phonemes and calculating peak statistical values of a selected frame having a determined length; referring to standard peak statistical values of phonemes in a phoneme table and calculating probability distances based on the peak statistical values of the selected frame and the standard peak statistical values; and recognizing a phoneme in the phoneme table, which has a minimum probability distance as a calculation result, as a phoneme in the selected frame.

According to another aspect of the present invention, there is provided a system for recognizing a phoneme in a speech signal, the system including a phoneme segmentation unit for segmenting phonemes by determining boundaries between the phonemes in an input speech signal; a frame length determiner for determining a frame length to be used for calculating peak statistical values of each of the segmented phonemes; a peak statistical value calculator for calculating peak statistical values of a selected frame having a determined length; a phoneme probability distance calculator for referring to standard peak statistical values of phonemes in a phoneme table and calculating probability distances based on the peak statistical values of the selected frame and the standard peak statistical values; and a phoneme recognition unit for recognizing a phoneme in the phoneme table, which has a minimum probability distance as a calculation result, as a phoneme in the selected frame.

BRIEF DESCRIPTION OF THE DRAWINGS

The above and other objects, features and advantages of the present invention will become more apparent from the following detailed description when taken in conjunction with the accompanying drawing in which:

FIG. 9 is a peak statistics table used to calculate a probability distance between phonemes according to the present invention.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention implements a function of correctly recognizing a phoneme in a speech signal. To do this, the present invention provides a method of correctly segmenting phonemes by determining a boundary indicating a start point and an end point of each of the segmented phonemes, and correctly finding the phoneme in the speech signal by determining which phoneme in a phoneme recognition standard table corresponds to each of the segmented phonemes. Using this phoneme recognition method, an amount of computation can be significantly reduced, and the phoneme in the speech signal can be easily found by calculating probability distances between phonemes.

Figure 1:
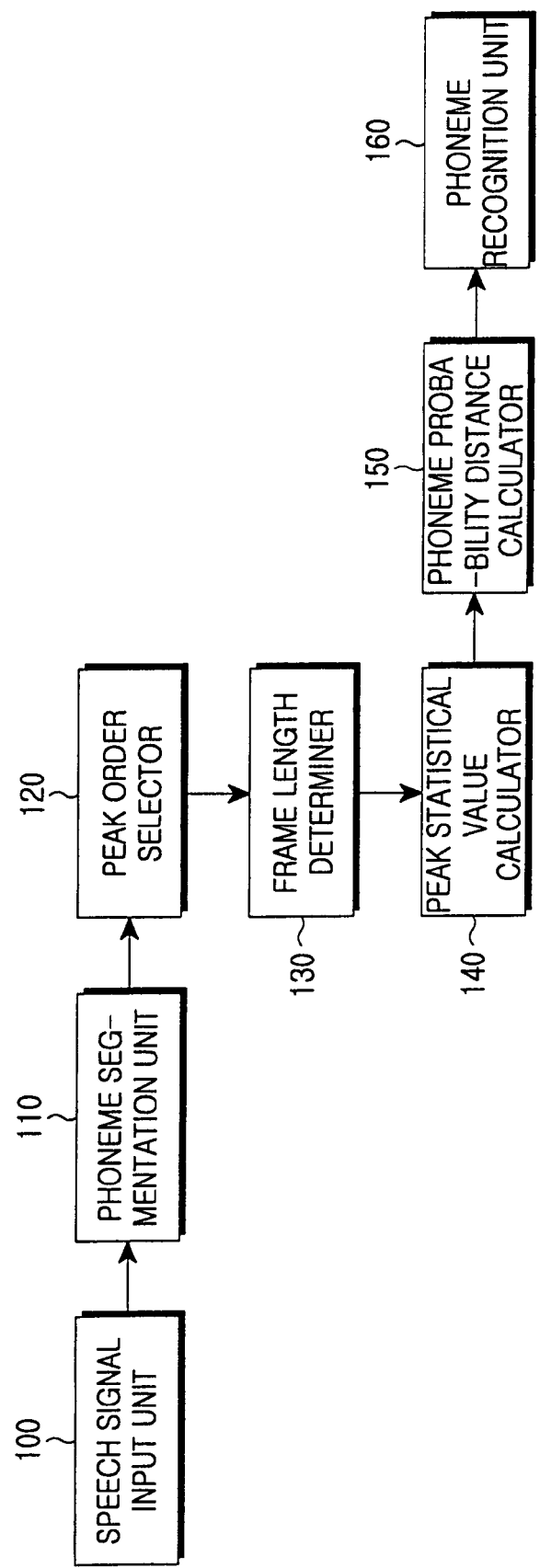
FIG. 1 is a block diagram of a system for recognizing a phoneme in a speech signal according to the present invention.

Components and their operations of a phoneme recognition system in which the above-described function is implemented will now be described with reference to FIG. 1, which shows a system for recognizing a phoneme in a speech signal according to the present invention.

The phoneme recognition system includes a speech signal input unit 100, a phoneme segmentation unit 110, a peak order selector 120, a frame length determiner 130, a peak statistical value calculator 140, a phoneme probability distance calculator 150, and a phoneme recognition unit 160.

The speech signal input unit 100 can include a microphone or a similar device and receives a speech signal containing voice and a sound signal.

The phoneme segmentation unit 110 segments phonemes by determining boundaries indicating a start point and an end point of each of the phonemes in the speech signal input from the speech signal input unit 100. Although a case where phonemes are segmented using a theorem of high-order peaks is described below, any method of correctly distinguishing a start point and an end point of each of phonemes can be applied.

An operation of the phoneme segmentation unit 110 in a case where the theorem of high-order peaks is used will now be described. The phoneme segmentation unit 110 extracts first-order peak information from the input speech signal and determines how high-order peaks are used by comparing a current-order peak measure value to a reference value (threshold), i.e., a predetermined threshold peak measure value, optimized according to a system. The amount of variance reduction of each value is used as a reference in the comparison. When $N^{th}$-order peaks are used, higher-order peaks than the $N^{th}$-order peaks do not have to be extracted. Second-order peaks are used as default, and first-order peaks can be also used in a general system.

If a peak order is determined in the above-described manner, the phoneme segmentation unit 110 determines the length of a frame to be used when peak statistical values are calculated, updates one point in each frame, and creates an accumulation graph through a slide and add operation.

The phoneme segmentation unit 110 calculates statistical values, i.e., a mean and a standard deviation, of determined-order peaks using the accumulation graph, determines a statistical value to be used as the threshold, and uses the standard deviation as default. The phoneme segmentation unit 110 segments phonemes by determining more than 20% greater values than surrounding values among values greater than the threshold as maxima and determining valleys between these maxima as boundaries of the phonemes.

When the phonemes are segmented, what each of the segmented phonemes indicates is determined. To do this, the peak order selector 120 extracts first-order peak information from each of the segmented phonemes and extracts each-order peak information using the theorem of high-order peaks, which is used to extract meaningful data, i.e., measure information. That is, peak information is extracted from the segmented phonemes, and a peak order is determined based on the extracted peak information.

The peak order selector 120 defines orders of the extracted peaks and determines how high-order peaks are used by comparing a current-order peak measure value to a reference value (threshold), i.e., a predetermined threshold peak measure value, optimized according to a system.

Figure 3:
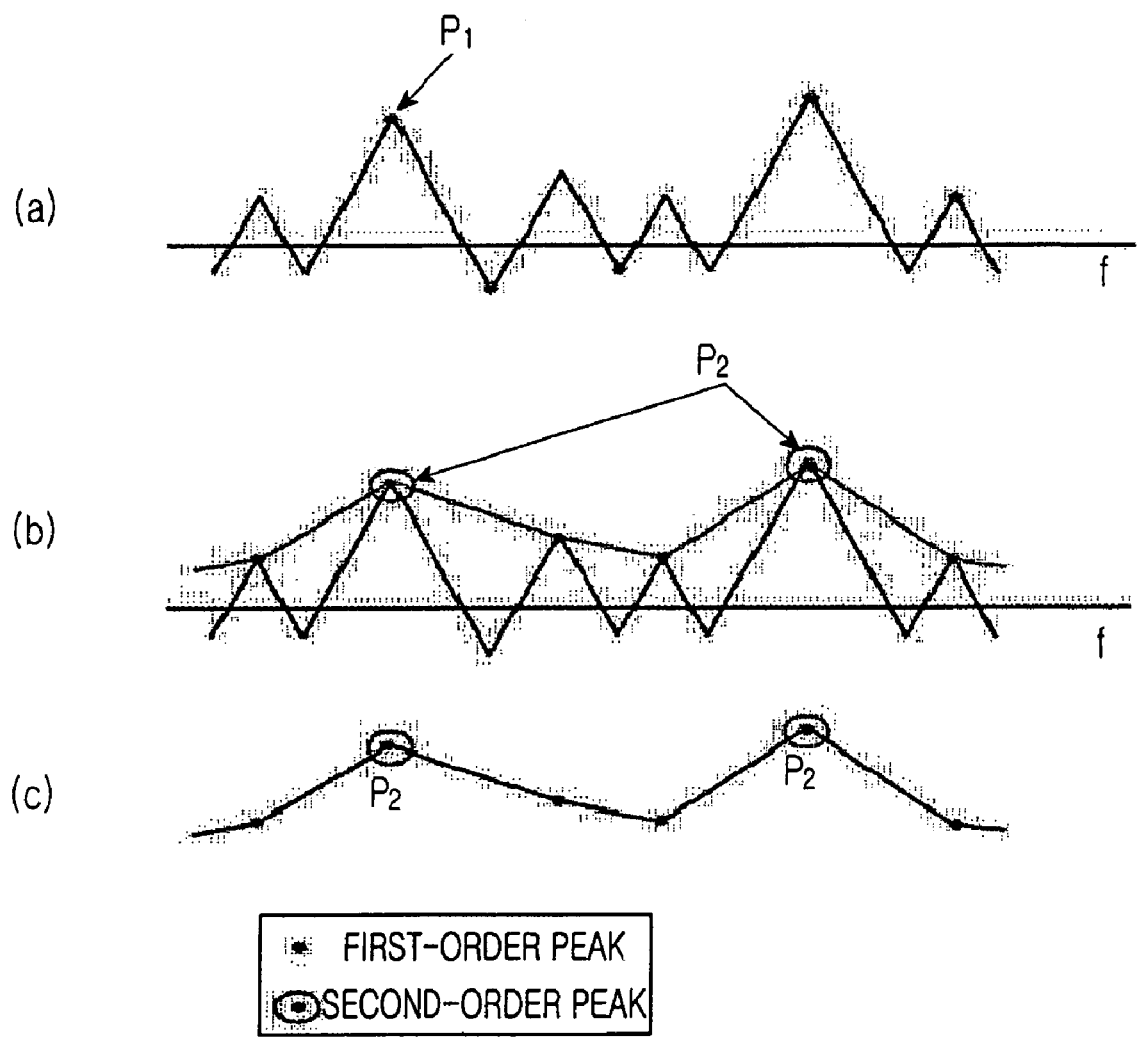
FIG. 3 are diagrams for explaining a process of defining $N^{th}$-order peaks according to the present invention.

Prior to description of the other components, high-order peaks will now be described. If peaks used are first-order peaks, in the present invention, peaks in a signal formed with first-order peaks are defined as second-order peaks as illustrated in FIG. 3. Likewise, third-order peaks are peaks in a signal formed with second-order peaks. The high-order peaks are defined as described above.

Thus, second-order peaks can be extracted by reconfiguring first-order peaks in a new time series and extracting peaks from the reconfigured first-order peaks. Likewise, high-order minima or high-order valleys can be defined. That is, second-order valleys correspond to local minima of first-order valleys reconfigured in a time series. These high-order peaks or valleys can be used as very effective statistical values in measure extraction of a speech or audio signal.

In particular, substantial information can be obtained through peak characteristic analysis of several orders in time and frequency axes. Useful measures can be extracted using histogram analysis, basic statistics such as mean and standard deviation, and secondary statistics obtained from a rate of the basic statistics. A Periodicity measure and a measure of voicing of voiced sound obtained using the useful measures are very useful information, and a correct peak order can be obtained for this measure extraction.

In an order level of the high-order peaks suggested in the present invention, average lower-order peaks have a lower level, and higher-order peaks have a lower frequency. For example, second-order peaks have a higher level than first-order peaks, and the number of second-order peaks is less than the number of first-order peaks.

An existence rate of each-order peaks can be very usefully used in measure extraction of a speech or audio signal, and in particular, second-order and third-order peaks have pitch extraction information.

Rules of high-order peaks are as follows.

1. Only one valley (peak) can exist between consecutive peaks (valleys).
2. Rule 1 is applied to each-order peaks (valleys).
3. High-order peaks (valleys) exist less than lower-order peaks (valleys) and exist in a subset of the lower-order peaks (valleys).
4. At least one lower-order peak (valley) always exists between two certain consecutive high-order peaks (valleys).
5. Average high-order peaks (valleys) have a higher (lower) level than lower order peaks (valleys).
6. An order in which only one peak and one valley (e.g., the maximum value and the minimum value in one frame) exist for a specific duration (e.g., during one frame) of a signal.

According to the rules of high-order peaks, the peak order selector 120 extracts peaks from each of the segmented phonemes, defines the extracted peaks as first-order peaks, and calculates standard deviation and mean of the first-order peaks. If the standard deviation or mean has a higher periodicity than a threshold, the peak order selector 120 selects a current order as a peak order, and if the standard deviation or mean has a lower periodicity than the threshold, the peak order selector 120 increases the current order. That is, the peak order selector 120 determines using the standard deviation or mean of each-order how high-order is used. The threshold is a value used to optimize the system.

When a certain order is determined by the peak order selector 120, the frame length determiner 130 determines the length of a frame to be applied when peak statistical values are calculated. The frame length determiner 130 described here uses a 512-point frame as a default, however this may vary as desired.

When the frame length is determined, the peak statistical value calculator 140 calculates statistical values of each frame based on the frame length determined by the frame length determiner 130 and the threshold for the phoneme recognition. Herein, a standard deviation of a probability density function (PDF) with respect to signal-plus-noise peaks is used as the threshold for the phoneme recognition, and the values illustrated in FIG. 9 showing statistical information of first, second, and third-order peaks with respect to 48 phonemes obtained using 512 points of each frame can be used as a standard phoneme table for the phoneme recognition. The phoneme table illustrated in FIG. 9 will now be described.

If a mean and standard deviation, i.e., peak statistical values, of a target frame are calculated, the phoneme probability distance calculator 150 searches which phoneme in the phoneme table illustrated in FIG. 9 corresponds to the mean and standard deviation obtained in the target frame. To do this, the phoneme probability distance calculator 150 calculates a probability distance between a phoneme in the target frame and each of phonemes in the phoneme table. A method of calculating the probability distance will now be described. It is assumed that a specific phoneme in the phoneme table is 'A' and the phoneme in the target frame is 'B'. In order to calculate a probability distance between phonemes, the phoneme probability distance calculator 150 calculates a mean of standard deviations, which is presented by Equation (1), using the peak statistical values obtained by the peak statistical value calculator 140.

Mean of standard deviations=(*A* standard deviation+*B* standard deviation)/2    (1)

In Equation (1), 'A standard deviation' denotes a standard deviation of an 'A phoneme' in the phoneme table, and 'B standard deviation' denotes a standard deviation obtained in the target frame.

By using Equation (1), the phoneme probability distance calculator 150 calculates the mean of standard deviations using the standard deviation among the statistical values obtained in the target frame and a standard deviation among peak statistical values of the specific phoneme 'A' in the phoneme table.

The phoneme probability distance calculator 150 calculates a probability distance using Equation (2).

Probability distance=(*A* mean+*B* mean)/mean of standard deviations    (2)

In Equation (2), 'A mean' denotes a mean of the 'A phoneme' in the phoneme table, 'B mean' denotes a mean obtained in the target frame, and 'mean of standard deviations' denotes a mean of 'A standard deviation' and 'B standard deviation', a unit of 'mean of standard deviations' being standard deviation.

By using Equation (2), the phoneme probability distance calculator 150 calculates the probability distance by dividing a difference between the mean among the peak statistical values of the target frame and the mean among the peak statistical values of the specific phoneme 'A' in the phoneme table by the mean of standard deviations obtained using Equation (1). The probability distance is used as a measured value for the measure extraction. As described above, in order to search which phoneme in the phoneme table corresponds to a phoneme in a target frame, the phoneme probability distance calculator 150 calculates a probability distance between the phoneme in the target frame and each of the phonemes in the phoneme table.

In reality, since a probability distance between phonemes can be categorized, the phoneme probability distance calculator 150 may perform clustering of the phonemes in the phoneme table, calculate probability distances using representative phonemes of the clusters, and calculate probability distances between the phoneme in the target frame and the phonemes of the cluster having the shortest probability distance one by one. In this case, since the phoneme probability distance calculator 150 does not have to calculate probability distances with respect to all the phonemes in the phoneme table, computation can be significantly reduced.

The phoneme recognition unit 160 receives probability distance calculation values from the phoneme probability distance calculator 150, determines the minimum probability distance calculation value among the received probability distance calculation values, and recognizes a phoneme in the phoneme table, which has the minimum probability distance calculation value, as the phoneme in the target frame. That is, a phoneme having the minimum calculated probability distance is determined as a recognition result.

Figure 2:
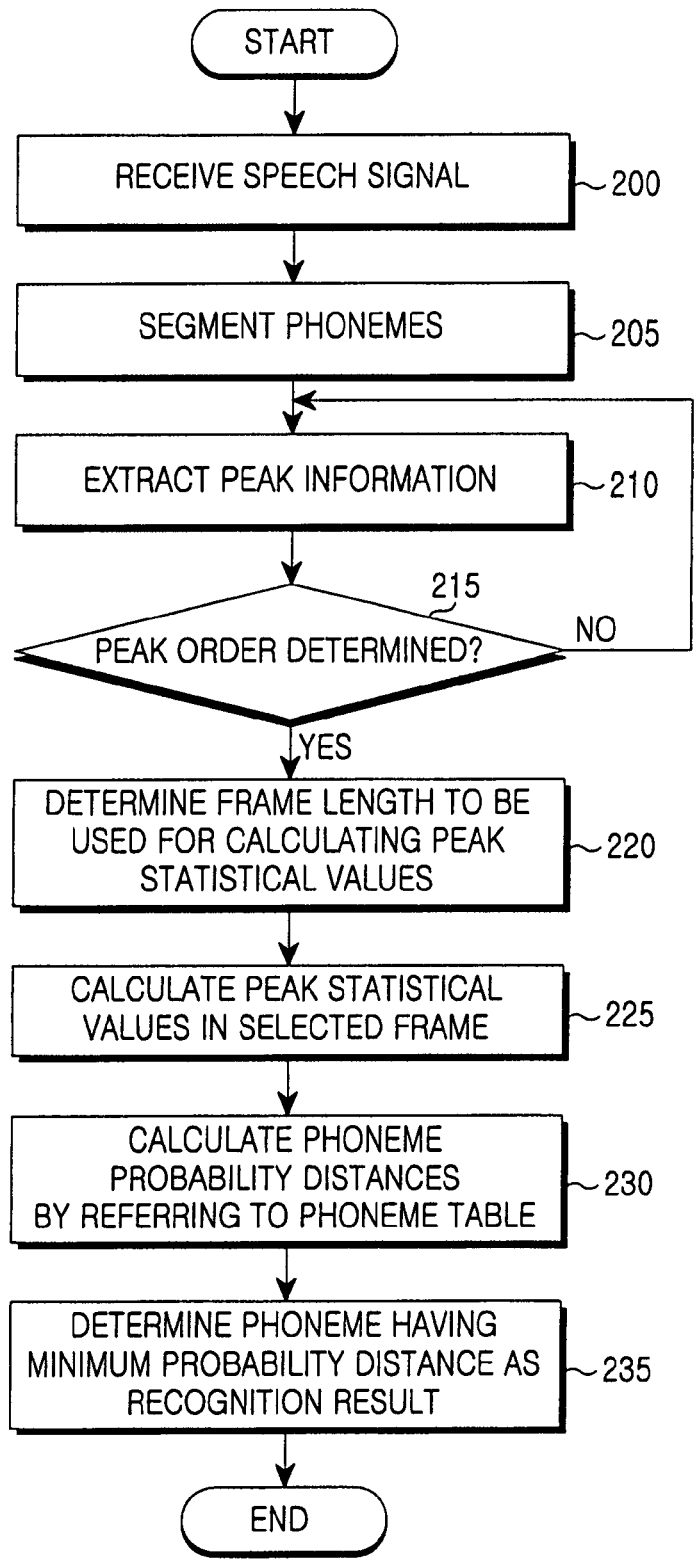
FIG. 2 is a flowchart illustrating a method of recognizing a phoneme in a speech signal according to the present invention.

Operations of the components described above will now be described with reference to FIG. 2 which shows a method of recognizing a phoneme in a speech signal according to the present invention.

The phoneme recognition system receives a speech signal through a microphone or a similar one in step 200 and performs phoneme segmentation of the received speech signal in step 205. The theorem of high-order peaks can be used for the phoneme segmentation. Since peaks exist above noise, the theorem of high-order peaks has a much more robust characteristic against noise than zero crossing in which the noise is mixed.

The phoneme recognition system extracts first-order peak information from the segmented phonemes in step 210 and determines how high-order peaks are used through a comparison process between an optimized reference value and the extracted first-order peak information. The optimized reference value varies according to each of various systems in which the speech signal is used, and indicates a reference value for optimizing a target system. Thus, the optimized reference value is a value to make performance of the phoneme recognition system be best and can be updated through repetitive experiments.

The phoneme recognition system determines in step 215 whether a peak order is selected. If the first-order peak information does not satisfy the optimized reference value, the phoneme recognition system goes back to step 200 and newly defines second-order peaks from the first-order peak information. That is, peaks of a signal formed in time series by first-order peaks are defined as the second-order peaks, as shown in FIG. 3.

FIG. 3 shows diagrams for explaining a process of defining $N^{th}$-order peaks according to the present invention. The peak order selector 120 defines peaks extracted by the phoneme segmentation unit 110 as first-order peaks $P_1$ as shown in diagram (a) of FIG. 3. The peak order selector 120 detects peaks $P_2$ in a state where the first-order peaks $P_1$ are connected as shown in diagram (b) of FIG. 3. The peak order selector 120 defines the detected peaks as the second-order peaks $P_2$ as shown in diagram (c) of FIG. 3.

Diagrams (a), (b), and (c) of FIG. 3 show each-order peaks needed to extract meaningful data from a speech signal in a time domain. According to diagram (a), an area in which a measure of the speech signal is suddenly changed is presented as a peak as indicated by $P_1$, and the measure of the speech signal is changed between voiced sound and unvoiced sound, at a start portion of the speech signal, and at an end portion of the speech signal, e.g., between words.

A horizontal axis of FIG. 3 denotes a position value, and a vertical axis of FIG. 3 denotes a magnitude value. How high order is used can be determined by using a variance and a mean of magnitude values of each-order peaks illustrated in FIG. 3 showing the theorem of high-order peaks. In general, a variance and a mean are respectively calculated using position values and magnitude values. Voiced sound has a lower variance and a higher mean than unvoiced sound, and on the contrary, unvoiced sound has a higher variance and a lower mean than voiced sound. Commonly, sound having no periodicity has a higher variance.

If it is determined that a peak order is selected, the phoneme recognition system determines a frame length to calculate peak statistical values in step 220. The phoneme recognition system calculates peak statistical values of a frame having the determined length in step 225. The phoneme recognition system calculates phoneme probability distances by referring to the phoneme table in step 230. The phoneme recognition system determines a phoneme having the minimum probability distance as a recognition result.

The principle by which a phoneme in the phoneme table, which has the minimum probability distance, is recognized as a phoneme of a target frame will now be described with reference to FIG. 9. FIG. 9 shows standard peak statistical values of each of phonemes, and a case where only first-order peak information is used will now be described, wherein a mean is 71.6 and a standard deviation is 4.7. In this case, a frame having the first-order peak information in which a mean is 71.6 and a standard deviation is 4.7 corresponds to a phoneme 'T' in the phoneme table. When a mean of standard deviations and a probability distance between peak statistical values of the frame and peak statistical values of a phoneme 'UW' in the phoneme table are calculated, the mean of standard deviations is $(2.4+4.7)/2=3.6$, and the probability distance is $(71.6-24.7)/3.6=13$. That is, a phoneme, i.e., the phoneme 'T', in the frame and the phoneme 'UW' in the phoneme table are separated from each other by 13 standard deviations. A probability of wrongly distinguishing two phonemes based on a probability distance having such a large value is very low. That is, since a probability of wrong recognition is below 0.0013 when a probability distance is greater than 3 in terms of Gaussian density, a phoneme can be easily recognized.

As another example, phonemes 'CH' and 'ZH', which can be similarly recognized when a conventional method is used, are compared. When a probability distance is calculated using the same method described above, the two phonemes 'CH' and 'ZH' are separated from each other by 8.8 $(=(75.1-22.6)/5.95)$ standard deviations. Thus, if the calculation method according to the present invention is applied, a probability of wrongly distinguishing the two phonemes 'CH' and 'ZH' is very low. Since the calculation method according to the present invention can also be applied to high-order peaks, more correct phoneme recognition can be performed using the calculation method according to the present invention. In general, an amount of computation can be specified by memory space and the number of operation counts, and in particular, extraction of peak information, which is used in the present invention, is performed by only integer operations. Thus, a run-off error frequently occurring in an add operation of a floating-point process can be prevented.

Figure 4:
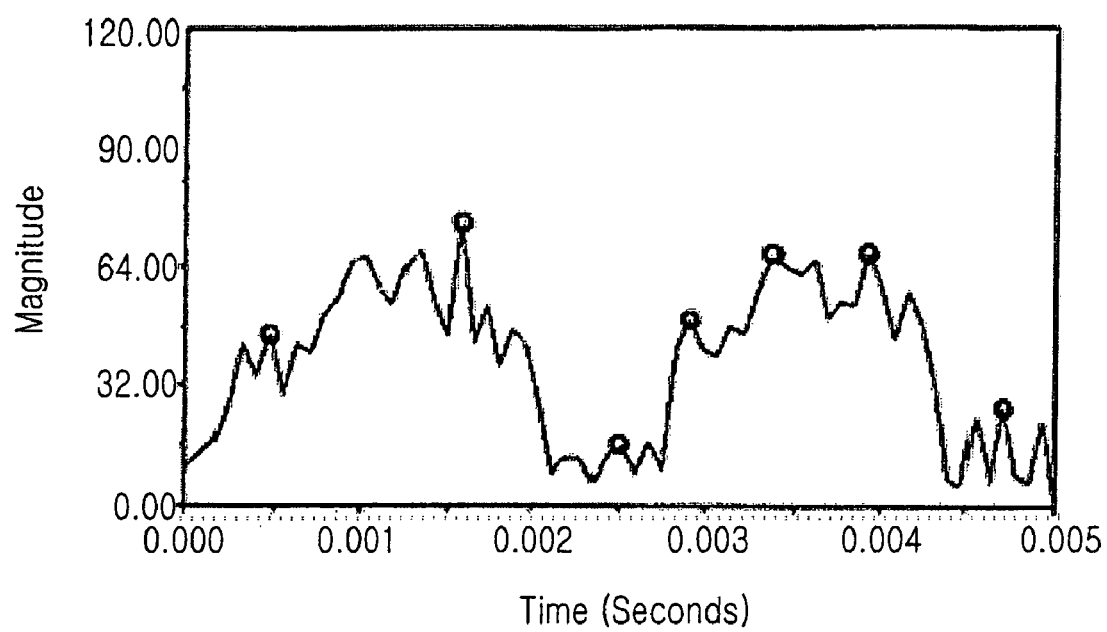
FIG. 4 is a graph illustrating a case where second-order peaks are selected according to the present invention.

As described above, when first-order peaks are selected, the calculation of a probability distance between a phoneme in the phoneme table and a phoneme in the target frame is a very simple calculation achieved by performing only two comparison operations in data points of both sides. In addition, the phoneme recognition method according to the present invention suggests a very simple calculation method even when high-order (higher than second-order) peaks are selected. For example, even though second-order peaks are selected, input data of the second-order peaks is also formed with peaks. FIG. 4 is a graph illustrating a case where second-order peaks are selected according to the present invention. FIG. 4 shows a 200 Hz sinusoidal signal in Gaussian noise, wherein circles in the signal waveform denote selected second-order peaks. Since input data of high-order (higher than second-order) peaks is also formed with peaks, the same comparison operations as the extraction of first-order peaks are applied to extraction of the high-order (higher than second-order) peaks. Thus, the amount of computation in the present invention is significantly small regardless of a peak order.

Figure 5:
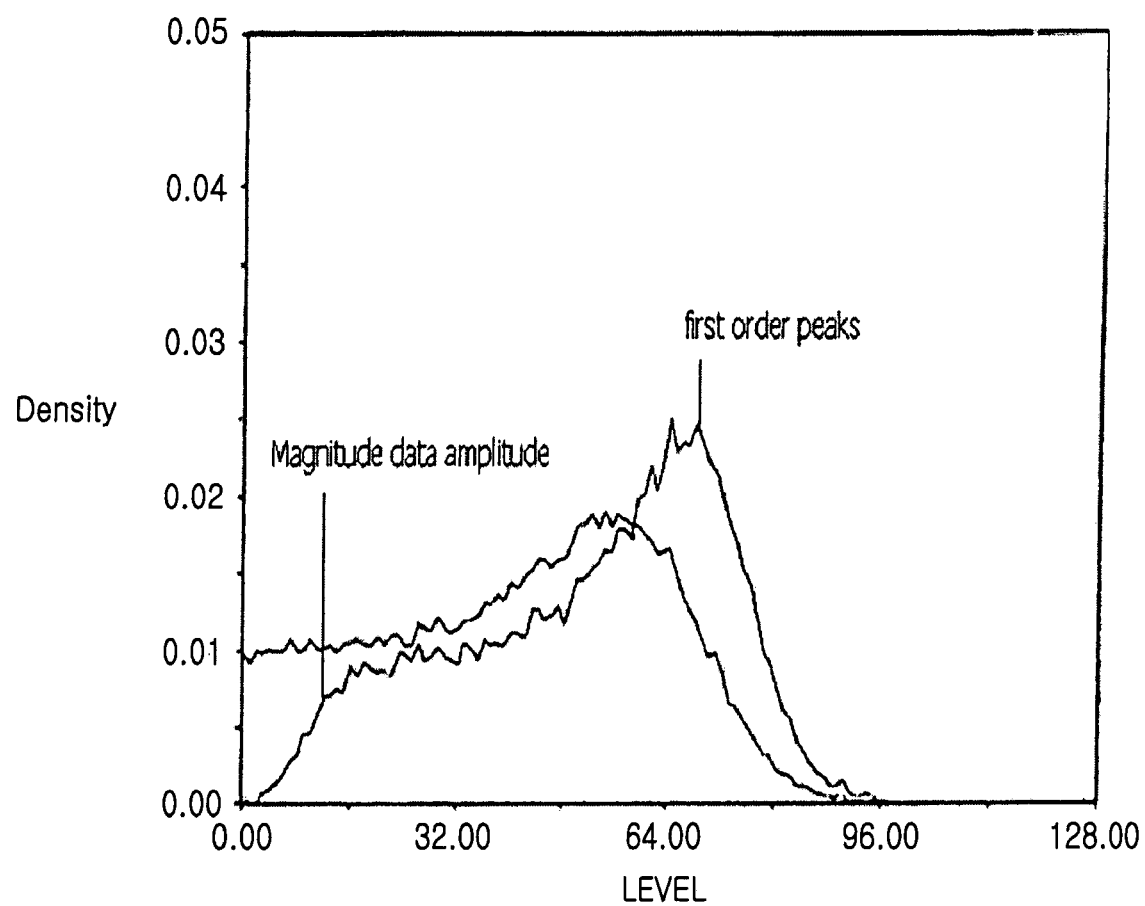
FIGS. 5 to 7 are histograms of signals output using a histogram creation method according to the present invention.
Figure 6:
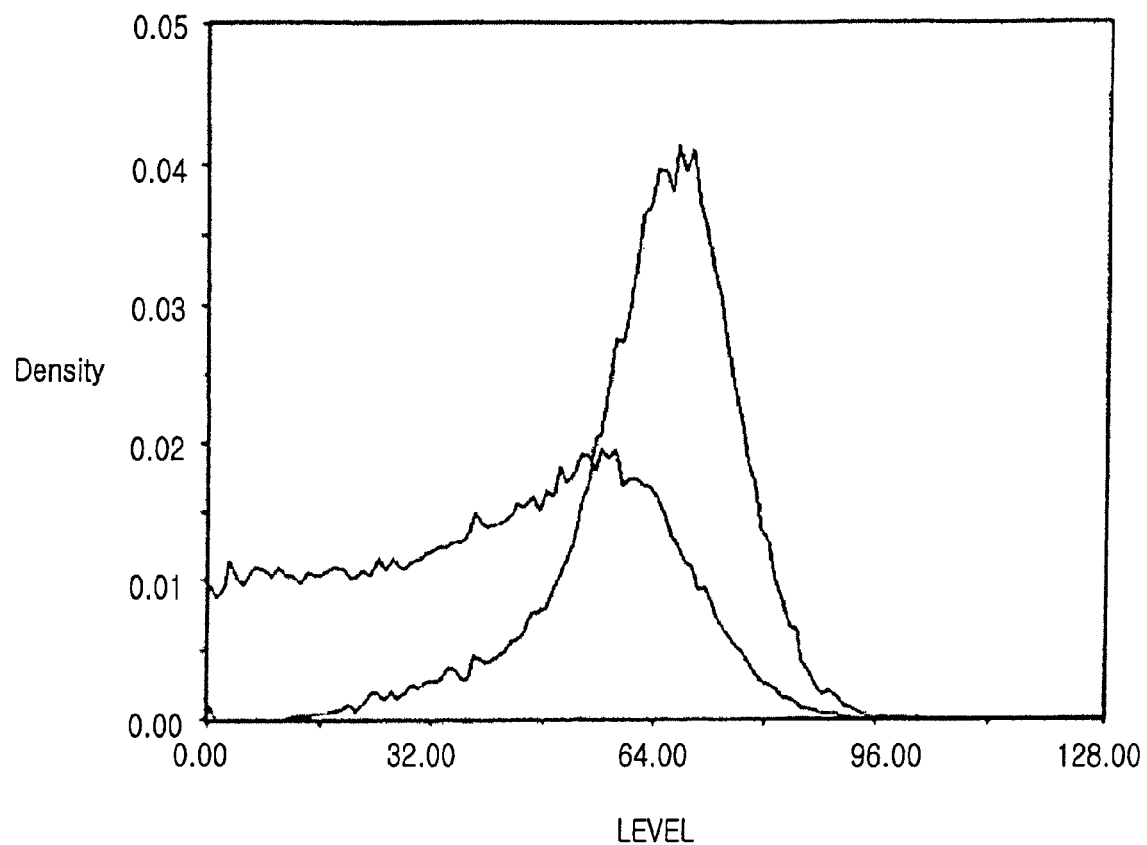
Figure 7:
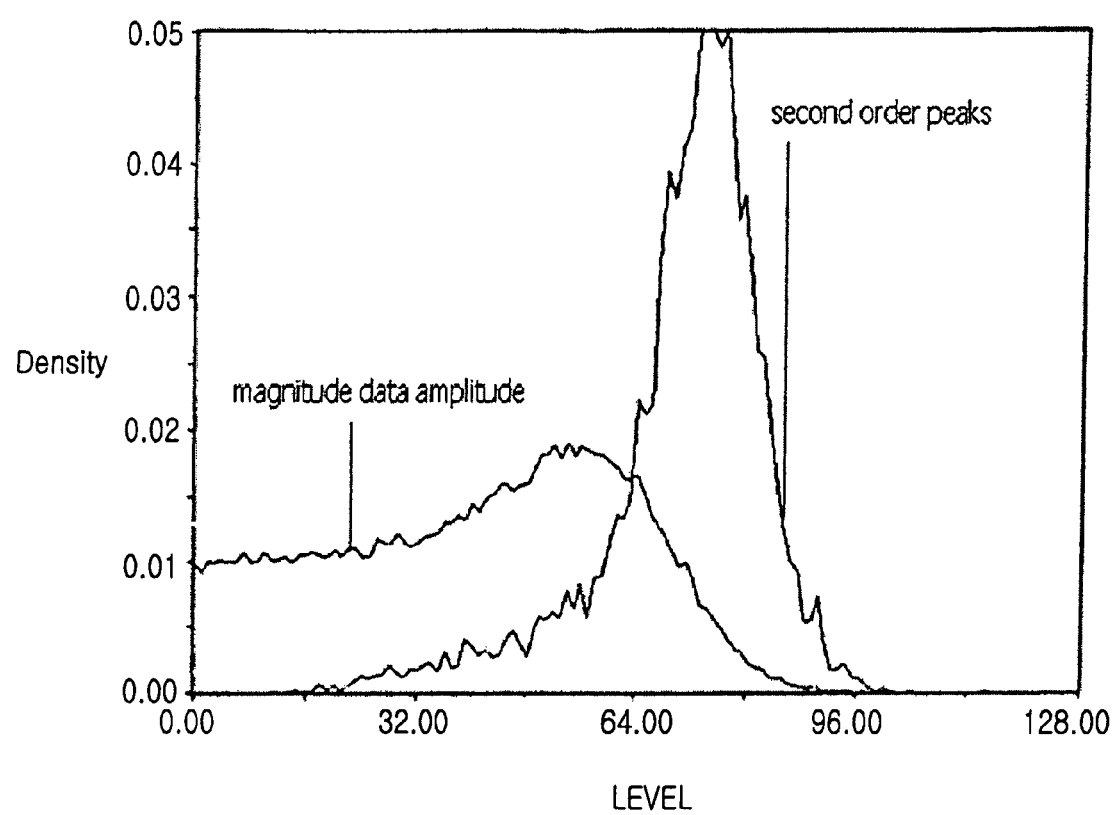

Examples of the phoneme segmentation are illustrated in FIGS. 5 to 7 that show histograms of signals output using a histogram creation method according to the present invention. FIG. 5 is a histogram of a magnitude of 200 Hz sine wave plus noise and first-order peaks, FIG. 6 is a histogram of a magnitude of 800 Hz sine wave plus noise and first-order peaks, and FIG. 7 is a histogram of a magnitude of 200 Hz sine wave plus noise and second-order peaks. In the present invention, the phoneme segmentation is performed by detecting a start point and an end point of each phoneme based on histogram analysis according to extraction of peak information, and each of the segmented phonemes is recognized through calculation of a probability distance of the phoneme using peak statistical values of each-order peak information.

Figure 8:
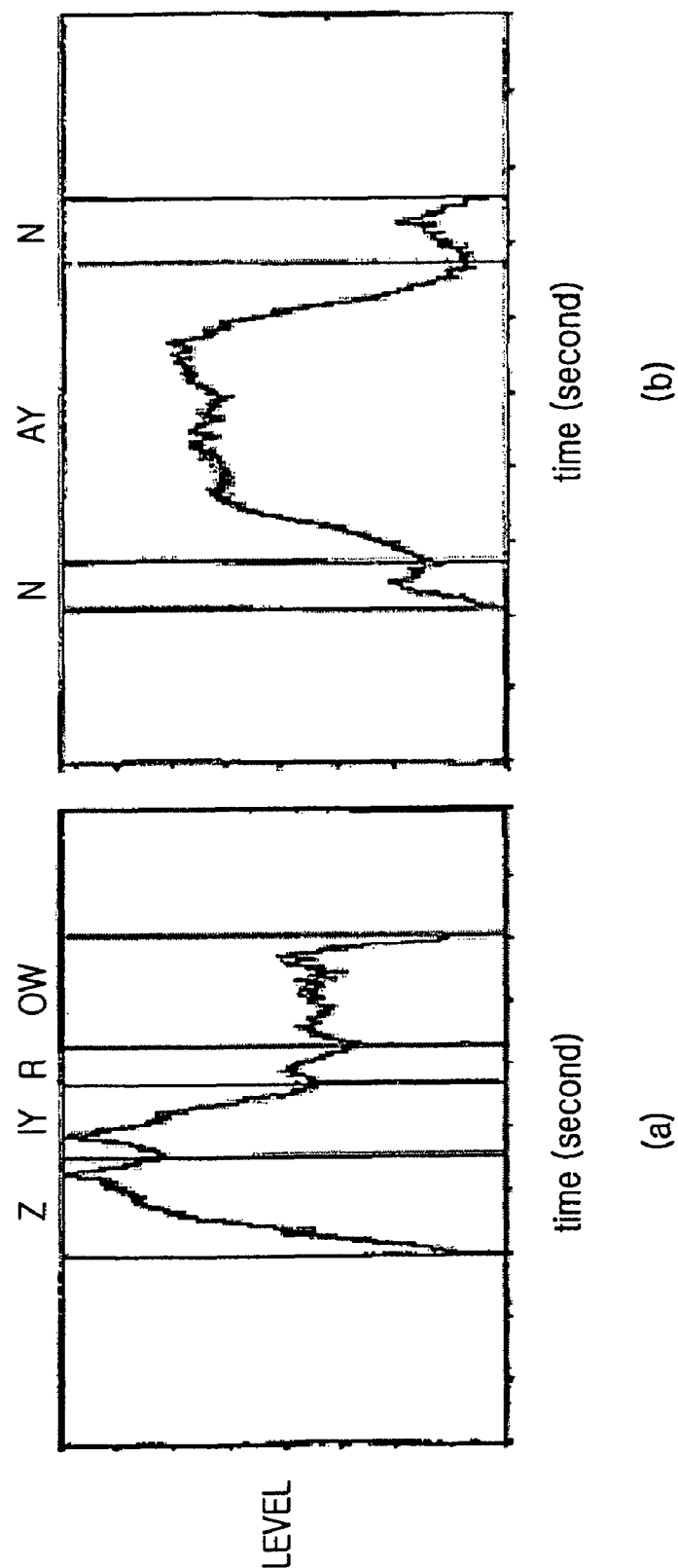
FIG. 8 are graphs for explaining a process of segmenting phonemes using peak information according to the present invention.

FIG. 8 shows graphs for explaining a process of segmenting phonemes using peak information according to the present invention, wherein the phoneme recognition method according to the present invention is applied to words 'zero' and 'nine'.

Although cases where peak measure information is based on an occurrence frequency of first-order peak information having values greater than a threshold needed to determine maxima used to recognize phonemes are shown in FIG. 8, peak measure information available in the present invention is not limited to the illustrations of FIG. 8. The peak measure information used to segment phonemes according to the present invention is determined according to a frequency and a magnitude of speech. Accordingly, not only first-order peak information but also statistical information of high-order peaks can be very usefully used for the measure extraction.

Diagrams (a) and (b) of FIG. 8 are graphs made using first-order peak information in which a standard deviation is a threshold every time each of 512-point frames is updated one point by one point, wherein phonemes are segmented by boundaries. In order to determine the boundaries, i.e., segmented positions, dominant maxima are searched, and valleys between the found dominant maxima can be the boundaries.

Since the peak measure information of each phoneme is indicated by valleys between maxima as shown in diagram (a) of FIG. 8, when each duration between two of valleys is considered as a phoneme, this consideration can be usefully used for phoneme recognition. The phoneme recognition can be more easily performed by analyzing which phoneme corresponds to each duration between two of valleys. As described above, since a start point and an end point of each phoneme can be distinguished based on valleys between maxima as shown in FIG. 8, differences between all phonemes can be distinguished.

Diagrams (a) and (b) of FIG. 8 show results in which phonemes segmented based on valleys are recognized as phonemes, each having the minimum probability distance, using the probability distance calculation method according to the present invention. Diagram (a) shows a result in which the segmented phonemes correspond to phonemes 'Z-IY-R-OW', respectively. Diagram (b) shows a result in which the segmented phonemes correspond to phonemes 'N-AY-N', respectively.

FIG. 9 is an each-order peak statistics table used to calculate a probability distance between phonemes according to the present invention. FIG. 9 shows first, second, and third-order peak statistical values of 48 phonemes in 512-point frames. The peak statistics table of FIG. 9 is used to calculate probability distances using Equations (1) and (2) based on a mean and a standard deviation of peaks in each frame, and as a result of the probability distances calculation, a phoneme in the peak statistics table, which has the minimum probability distance, is recognized as a spoken phoneme.

As described above, in a phoneme recognition method and system according to the present invention, problems, which can be generated when a conventional method is applied with several assumptions such as signal, system, and operational environment, can be solved, and since an additional assumption is unnecessary, a computational load is low, and thus the phoneme recognition method can be applied to various systems.

In addition, the phoneme recognition method has general usability and practicability to be applied to systems (recognition, coding, synthesis, strengthening, and so on) using a speech signal, and since the phoneme recognition method is a core technique for phoneme recognition of a speech signal, the phoneme recognition method can be used all systems using a speech signal.

In addition, since the phoneme recognition method is a method of finding a phoneme having the minimum probability distance through a very simple probability distance calculation, the phoneme recognition method has correct and efficient phoneme recognition performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of recognizing a phoneme in a speech signal with a phoneme recognition system, the method comprising the steps of:
    segmenting phonemes by determining boundaries between the phonemes in an input speech signal;
    determining a frame length to be used for calculating peak statistical values of each of the segmented phonemes and calculating peak statistical values of a selected frame having the determined length;
    referring to standard peak statistical values of phonemes in a phoneme table and calculating probability distances based on the peak statistical values of the selected frame and the standard peak statistical values; and
    recognizing a phoneme in the phoneme table by the phoneme recognition system, which has a minimum probability distance as a calculation result, as a phoneme in the selected frame.

2. The method of claim 1, wherein the peak statistical values of the selected frame comprise a mean and a standard deviation with respect to the phoneme to be recognized in the selected frame, and the peak statistical values in the phoneme table comprise means and standard deviations with respect to 48 phonemes of each peak order.

3. The method of claim 1, wherein each of the probability distances is obtained using an equation 'probability distance =(A mean+B mean)/mean of standard deviations', where 'A mean ' denotes a mean of an 'A phoneme' in the phoneme table, 'B mean ' denotes a mean obtained in the selected frame, and 'mean of standard deviations' denotes a mean of 'A standard deviation' and 'B standard deviation', where 'A standard deviation' denotes a standard deviation of an 'A phoneme' in the phoneme table and 'B standard deviation' denotes a standard deviation obtained in the selected frame.

4. The method of claim 1, further comprising:
    determining a peak order by extracting peak information from the segmented phonemes; and
    determining a frame length to be used for calculating peak statistical values in the determined peak order if the peak order is determined.

5. The method of claim 4, wherein the step of determining a peak order comprises:
    extracting peak information from the speech signal in a time domain;
    defining a current peak order based on the extracted peak information;
    comparing a peak measure value in the defined current peak order to a predetermined threshold peak measure value; and
    determining the current peak order as the peak order when the peak measure value is greater than the threshold peak measure value.

6. The method of claim 5, further comprising:
    defining a new peak order by increasing the current peak order, and comparing a peak measure value in the defined new peak order to the threshold peak measure value when the peak measure value is less than the threshold peak measure value;
    determining the new peak order as the peak order when the peak measure value is greater than the threshold peak measure value; and
    iterating this process when the peak measure value is less than the threshold peak measure value.

7. The method of claim 1, wherein the selected frame having the determined length is a 512-point frame as default.

8. The method of claim 1, wherein the step of segmenting phonemes comprises:
    extracting peak information from an input speech signal;
    calculating peak statistical values of each frame based on the extracted peak information;
    determining maxima among the peak statistical values of each frame; and
    segmenting the phonemes by determining valleys existing between the maxima as boundaries between the phonemes.

9. A system for recognizing a phoneme in a speech signal, the system comprising:

a phoneme segmentation unit for segmenting phonemes by determining boundaries between the phonemes in an input speech signal;

a frame length determiner for determining a frame length to be used for calculating peak statistical values of each of the segmented phonemes;

a peak statistical value calculator for calculating peak statistical values of a selected frame having a determined length;

a phoneme probability distances calculator for referring to standard peak statistical values of phonemes in a phoneme table and calculating probability distances based on the peak statistical values of the selected frame and the standard peak statistical values; and a phoneme recognition unit for recognizing a phoneme in the phoneme table, which has a minimum probability distance as a calculation result, as a phoneme in the selected frame.

10. The system of claim 9, wherein the peak statistical values of the selected frame comprise a mean and a standard deviation with respect to the phoneme to be recognized in the selected frame, and the peak statistical values in the phoneme table comprise means and standard deviations with respect to 48 phonemes of each peak order.

11. The system of claim 9, wherein each of the probability distances is obtained using an equation 'probability distance=(A mean+B mean)/mean of standard deviations', where 'A mean' denotes a mean of an 'A phoneme' in the phoneme table, 'B mean' denotes a mean obtained in the selected frame, and 'mean of standard deviations' denotes a mean of 'A standard deviation' and 'B standard deviation', where 'A standard deviation' denotes a standard deviation of an 'A phoneme' in the phoneme table and 'B standard deviation' denotes a standard deviation obtained in the selected frame.

12. The system of claim 9, further comprising a peak order selector for extracting peak information from the segmented phonemes and determining a peak order based on the extracted peak information.

13. The system of claim 12, wherein the peak statistical value calculator calculates peak statistical values in a selected frame of the determined peak order.

14. The system of claim 12, wherein if peak information is extracted from a speech signal in a time domain by the phoneme segmentation unit, the peak order selector defines a current peak order based on the extracted peak information, compares a peak measure value in the defined current peak order to a predetermined threshold peak measure value, and determines the current peak order as the peak order when the peak measure value is greater than the threshold peak measure value.

15. The system of claim 14, wherein the peak order selector defines a new peak order by increasing the current peak order, and compares a peak measure value in the defined new peak order to the threshold peak measure value when the peak measure value is less than the threshold peak measure value, determines the new peak order as the peak order when the peak measure value is greater than the threshold peak measure value, and iterates this process when the peak measure value is less than the threshold peak measure value.

16. The system of claim 9, wherein the selected frame having the determined length is a 512-point frame as default.

17. The system of claim 9, wherein the phoneme segmentation unit extracts peak information from the input speech signal, calculates peak statistical values of each frame based on the extracted peak information, determines maxima among the peak statistical values of each frame, and segments the phonemes by determining valleys existing between the maxima as boundaries between the phonemes.

* * * * *